Patented Apr. 20, 1937

2,077,533

UNITED STATES PATENT OFFICE 2,077,533

PROCESS FOR THE TREATMENT OF THE FLESH OF MARINE MAMMALS

Hans Schmalfuss and Hans Werner, Hamburg, Germany

No Drawing. Application June 28, 1934, Serial No. 732,926. In Germany July 8, 1933

5 Claims. (Cl. 99—112)

The invention relates to a process for the treatment of the flesh of marine mammals. Hitherto the flesh of the whale could not be utilized because, with its content of only 21% dry material it could not be dehydrated on board ship, and because it readily putrefies. Consequently it was thrown into the sea.

In order to utilize the great quantities of whale flesh obtained it has already been proposed to dehydrate the flesh by heating in a bath of train oil or other oil. These processes have, however, not been successful because the already very high content of oil in the whale flesh is further increased thereby, because the digestibility of the albumen is considerably reduced by the heating, and because they did not free the flesh from its water content to such an extent that the flesh would keep. As soon as the whaling vessels came from the Antartic into warmer latitudes, particularly into the vicinity of the tropics, then the partially dehydrated flesh also putrefied. In addition it was of dark colour so that this uneconomical process could not be utilized in practice.

Flesh has already been made capable of keeping by pickling with a salt lye. Fish also have been treated in this manner. Nevertheless, this known process hitherto has not been capable of being used for the flesh and organs of marine mammals containing train oil, because the final product exhibited the taste and odour of train oil, and thus was unsuited for human consumption.

It has already been attempted to obtain an extract from fish flesh. The gutted and scaled fish for this purpose is washed with water, subdivided and thereupon treated under pressure with superheated steam, so that the albumen is hydrolytically degraded and converted into a soluble form. In this way also the glue substances are simultaneously brought into solution. The product has an unpleasant fishy flavour and smell which must be removed as far as possible by means of a cumbersome treatment in a current of steam or with organic solvent materials. After evaporation of the broth formed under reduced pressure, a loose light yellow coloured powder is obtained which contains about 22.5% of albumen, 62.5% of primary albumoses and 15% of deuteroalbumoses which has, however, a particularly bitter earthy taste which renders its use for cooking purposes impossible so that this extract has to be employed for animal feeding and the like.

It was, therefore, in great degree unexpected that flesh extracts which are outstandingly suitable for human nutrition could be obtained from sea animals such as whales, fish and the like in the following manner, namely by subjecting the flesh of the sea animals, for example whale flesh, preferably after subdivision, to the action of cold water, the mixture being slowly warmed to high temperature, for example, to a temperature above 80 or 90° C. and in a mechanical manner, for example by filtration, centrifuging or the like, so separated that the aqueous solution is practically free from fat and albumen, the aqueous product being thereupon evaporated for example under reduced pressure.

The separation of the aqueous product from the remaining constituents of the extraction mixture can, for example, be so effected that the mixture is filtered under ordinary pressure through a filter moistened with water or with an aqueous solution so that the non-aqueous portion such as oil, fat, albumen compounds and the insoluble residue remain behind on the filter.

It has further been found that the flesh which is obtained in large quantities as waste in the production of flesh extract can advantageously be used as cattle food and the former difficulties can be overcome when the subdivided flesh is pressed and dried after extraction with hot water and the contraction occasioned thereby.

*Example 1.*—100 kgs. of whale flesh are subdivided in the usual manner and intimately mixed with 350 litres of cold water. The mixture is heated to a temperature of, for example, 96° C. while the mass preferably is continually stirred up. Then, if desired, after cooling, it is filtered at ordinary air pressure through a filter which has previously been moistened with water. The clear broth passes through the filter while the insoluble extraction residue as well as the fat and coagulated albumens together with the troublesome flavouring and odoriferous constituents remain behind on the filter. The clear solution is then evaporated under reduced pressure in known manner, for example, to a water content of about 10 to 20%. About 3 kgs. of flesh extract are obtained having a pleasant aromatic odour and no fishy or train oil odour or flavour. It has been found that the unpleasant flavouring and odoriferous constituents are obviously bound and retained with the fat and the albumen, so that a deodorization of the flesh extract is not necessary.

*Example 2.*—23 tons of whale flesh are subdivided by means of a suitable comminuting device to particles of, for example, 3 to 5 mm. diameter and are heated to 95° C. for about 30 minutes with 12 tons of water by the introduction of direct steam. Thereupon the aqueous solution is drawn off and can be treated to form a flesh extract for example in accordance with Example 1. If desired, the flesh can be treated with hot water again or a number of times.

The flesh thus extracted which is reduced in bulk to a far-reaching extent is then freed from the main quantity of water by mechanical means for example by filtering, centrifuging or the like. By pressing, e. g. in sieve presses, worm presses or the like, the water content is further reduced and the pressed material is finally dried. The drying can be effected in a drum drier and the material is fed in the same direction as the drying gases for instance in order to avoid overheating, so that the hot drying gases come into contact with the product which still contains water, and travel through the drying drum therewith, and the cooled heating gases leave the drying drum together with the practially dry material.

About 4.8 tons of a light coloured whale meal are obtained which contain about 86% of albumen, about 11% of fat and about 2% of water. The albumen is practically completely digestible, and it has been found that it contains only about 2.3% of indigestible components.

Whereas the fresh flesh holds the water firmly so that a dehydration is not economical, the flesh extracted with hot water according to the present invention has lost the property of stubbornly retaining the water in the cells. A contraction occurs due to the extraction with hot water. The flesh can then be pressed to a large extent, for example in worm presses, sieve presses or the like, and thereupon can readily be dried in suitable drying devices, for example drum driers, conduit driers, multi-stage driers, and can be in fact dried to such an extent, as has been shown, that the water content is about 2% and less. At the same time the albumen remains almost completely digestible, and a light coloured flesh meal is obtained which can be carried even through the tropics without risk of putrefaction and which keeps practically without limit.

*Example 3.*—100 kgs. of gutted dolphins are first washed with water, subdivided and then treated with about 100 litres of water in the manner described in Example 2, and after heating are so separated in a centrifuge that the aqueous extract is separated from the undissolved residues, the fat and the coagulated albumens together with the undesired flavouring and odoriferous constituents. The aqueous extract is then further treated as in Example 2.

According to the present invention it is made possible in economical manner to treat the flesh to obtain valuable products which can serve for human nourishment. This could not be foreseen because as is known the fish smell and odour is extremely penetrating, is very persistent and according to previous experience it is not possible to render the flesh odourless by removing the fat.

The products according to the present invention are rich in creatin, creatinin, sarkin, peptone, albumoses and other extracted materials, and they are practically free from water insoluble and coagulable albumen, have pleasant odour and flavour and can be evaporated to a low water content of less than 20%, or even practically to dryness. By the present invention it is possible to convert into valuable products and to render suitable for human nutrition the greater proportion of the waste products of flesh of sea beasts which in the known processes of train oil production are converted to less valuable fodders or fertilizers.

We claim:

1. A process for the treatment of marine mammal tissue comprising subdividing the tissue, adding cold water, warming the mixture to a temperature between 80 and 96° C., then separating the aqueous constituent thereof from the solid residues which contain fat, albumen and the undesired entrained residues which give rise to a trainy odor and taste, and pressing and drying the solid residues.

2. A process for the treatment of marine mammal tissue comprising subdividing the tissue, adding cold water, warming the mixture to a temperature between 86 and 96° C. unil a concentrated aqueous extract is formed which is substantially free from coagulable albumen, and separating the extract from the solid residues which contain fat, albumen and the undesired entrained residues which give rise to a trainy odor and taste.

3. A process for the production of an extract from the tissue of marine mammals comprising subdividing the tissue of marine mammals, adding cold water, warming the mixture to a temperature between 80 and 96° C., then mechanically separating the aqueous constituent of the mixture from the fat, albumen, other solid residues and the undesired entrained residues which give rise to a trainy odor and taste which are retained by the solid residues.

4. A process for the production of an extract from the tissue of marine mammals comprising subdividing the tissue of marine mammals, adding cold water, warming the mixture to a temperature between 80 and 96° C., then mechanically separating the aqueous constituent of the mixture from the fat, albumen, other solid residues and the undesired entrained residues which give rise to a trainy odor and taste which are retained by the solid residues, and inspissating the aqueous constituent.

5. A process for the production of an extract from the tissue of marine mammals comprising subdividing the tissue of marine mammals, adding cold water, warming the mixture to a temperature between 80 and 96° C., then mechanically separating the aqueous constituent of the mixture from the fat, albumen, other solid residues and the undesired entrained residues which give rise to a trainy odor and taste which are retained by the solid residues, by filtering under ordinary pressure through a filter previously moistened with an aqueous liquid.

HANS SCHMALFUSS.
HANS WERNER.